March 10, 1942.　　　V. G. KLEIN　　　2,276,207
PUMP
Filed Sept. 30, 1939　　　3 Sheets-Sheet 2

Victor G. Klein
Inventor.
Haynes, Koenig and Wolf,
Attorneys.

March 10, 1942.  V. G. KLEIN  2,276,207
PUMP
Filed Sept. 30, 1939  3 Sheets-Sheet 3

Victor G. Klein,
Inventor.
Haynes, Koenig and Wolf,
Attorneys.

Patented Mar. 10, 1942

2,276,207

UNITED STATES PATENT OFFICE 2,276,207

PUMP

Victor G. Klein, St. Louis, Mo., assignor to Lincoln Engineering Company, St. Louis, Mo., a corporation of Missouri Application September 30, 1939, Serial No. 297,226

3 Claims. (Cl. 221—47.1)

This invention relates to pumps, and with regard to certain more specific features, to lubricant dispensing pumps.

Among the several objects of the invention may be noted the provision of a lubricant pump which is driven by means of a continuously operating internal-combustion engine; the provision of apparatus of the class described in which effective provision is made for permitting the engine to operate continuously although only intermittent lubricant flow is required; the provision of apparatus is the class described in which clutching and de-clutching of the continuously-operating engine is avoided; and the provision in apparatus of this class of a pump valve which will be effective under the conditions imposed upon it by the continuous operation of said engine. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is an end elevation of the apparatus, parts being shown in section;

Similar reference characters indicate corresponding parts throughout the several views of the drawings.

In many cases it is desirable to operate a lubricant pump in locations where no electricity is available, and for this purpose a small internal-combustion engine, such as a gasoline engine or the like, is desirable. As usual, the desired lubricant flow, under pressure, is intermittent, but it is not feasible to start and stop an internal-combustion engine accordingly. Furthermore, lubricant pressure should be instantly available at all times in the conduit which leads to the lubricant control valve.

Figure 1:
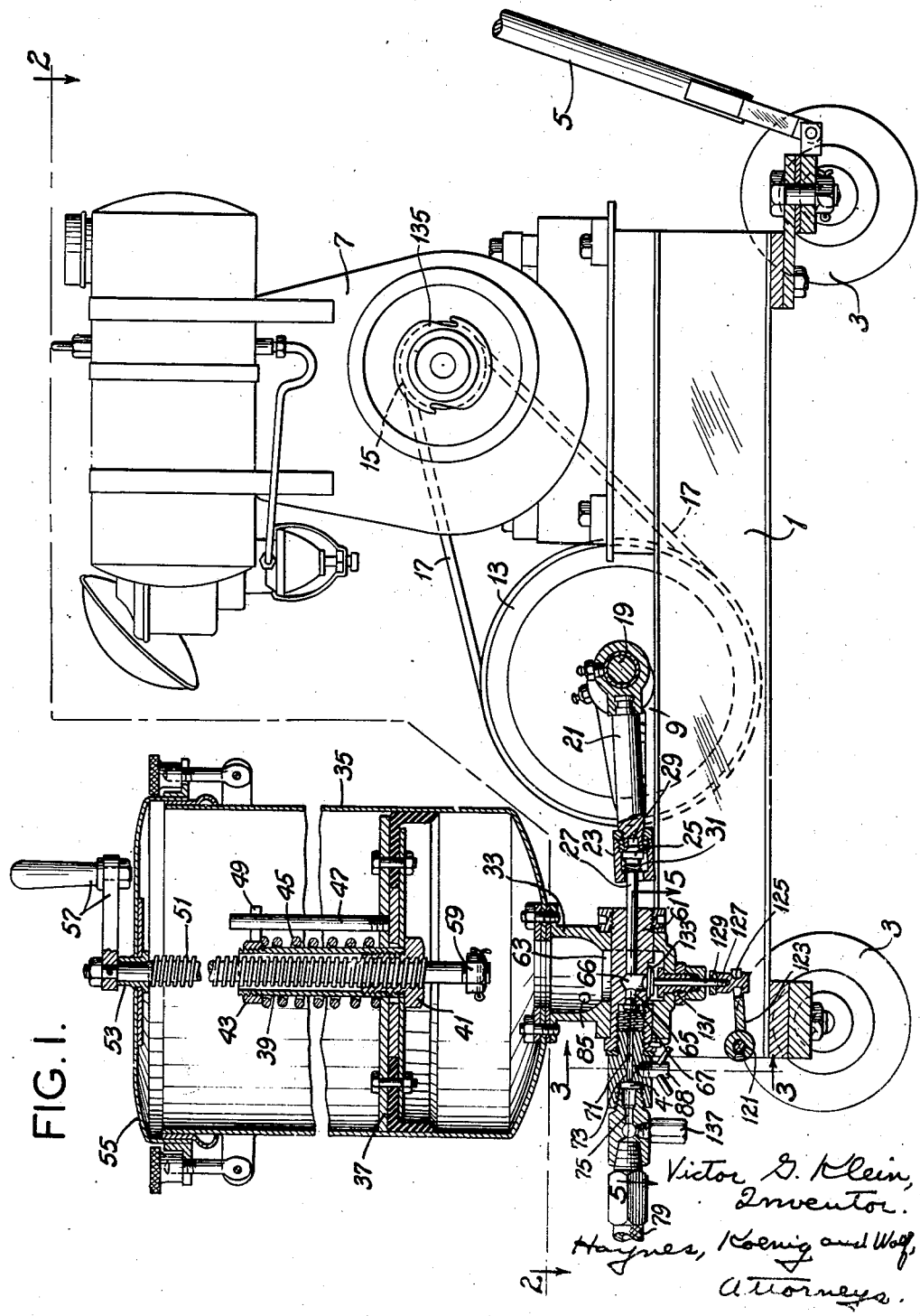
Figure 2:
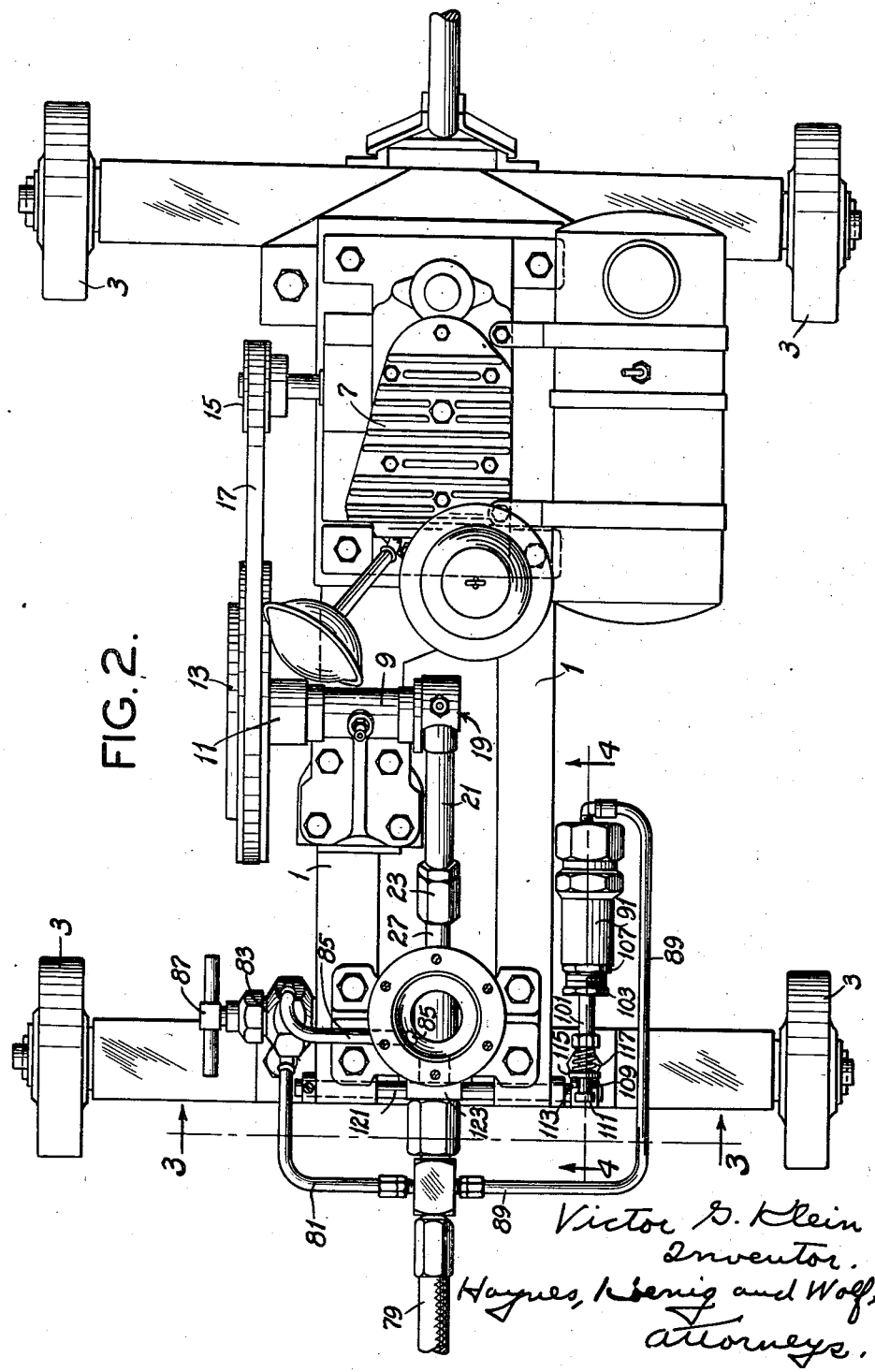
Fig. 2 is a view taken on line 2—2 of Fig. 1, and being partially in section.

Referring more particularly to Fig. 1, there is shown a portable chassis 1 on suitable wheels 3, adapted to be drawn about by means of a handle 5. Upon the chassis 1 is mounted a suitable internal-combustion engine 7. In a bearing 9 on the chassis 1 is carried a counter-shaft 11 (Fig. 2) upon which is mounted a pulley 13. The pulley 13 is connected by means of a belt 17 to a driving pulley 15 on the engine 7. Thus pulleys 13, 15 and belt 17 constitute a continuously operative drive between the continuously operative engine 7 and the counter-shaft 11.

On the end opposite to the pulley 13, the counter-shaft 11 carries a crank 19 which is articulated to a connecting rod 21. The connecting rod 21 carries a socket 23 surrounding a ball-and-socket joint 25, 29, the ball portion 25 of which is attached to the rear end of a pump plunger 27, and the cooperating socket portion of which is shown at 29 in the connecting rod 21. A spring 31 reacting within the socket 23 maintains a connection between the ball element 25 and socket element 29. By means of this connection angular movement is permitted between the plunger 27 and the connecting rod 21.

The remainder of the pump (of which 27 constitutes the plunger) is supported in a manifold casting 33, which in turn is supported upon chassis 1. This manifold 33, which is hollow, supports a supply tank 35, which is in communication therewith and which contains lubricant, such as grease.

A follower piston 37 which slidably engages the inner walls of the tank 35 is centrally slidably arranged upon a sleeve 39, the latter having threaded in its lower end a fixed nut which forms a collar 41 limiting the downward sliding movement of the piston with respect to the sleeve 39. At its upper end the sleeve 39 carries a second collar 43, forming a reaction point for a spring 45. The spring 45 at its other end presses against the piston 37 and forces it toward the movement-limiting shoulder 41. In order to prevent rotary motion between the piston 37 and the collar 43 (and thus to prevent twisting in the spring 45), there is threaded into the piston 37 a pin 47 which is engaged by a slidable fork 49 attached to the collar 43.

Threaded through the shoulder nut 41 is a drive screw 51 which passes through a bearing 53 in a removable closure 55 and which carries outside of the closure a hand crank 57. Rotation of the crank and screw 51 results in driving the shoulder nut 41 up or down, the motion being limited by a keyed nut 59 on the lower end of the screw 51. When the shoulder nut 41 is driven down, the spring 45 will be compressed because the piston 37 engages the top of the grease. It is therefore possible by several revolutions of the crank 57 to compress the spring and so to store energy in it, so that as lubricant is used up from beneath the piston 37 the spring forces the piston 37 to follow the lubricant as it is exhausted to maintain a substantial pressure thereon.

The plunger 27 reciprocates in the cylinder 65 of a sleeve 61 which passes through a sump 63 formed at the bottom of the manifold 33. The cylinder 65 in the sleeve 61 is in communication with said sump 63 through an inlet port 66. The end of the plunger 27 in reciprocating within the cylinder 65 crosses and re-crosses the inlet 66.

Figure 5:
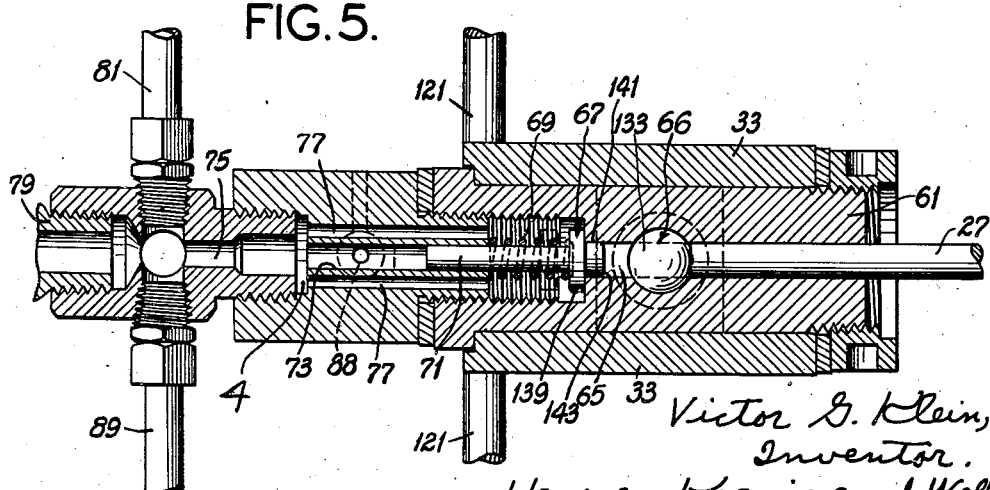
Fig. 5 is a horizontal section taken on line 5—5 of Fig. 1.

The outlet end (left end; Figs. 1 and 5) of the cylinder 65 is covered by check valve 67 normally biased to close by means of a spring 69 which surrounds the valve stem 71. The valve stem 71 slides in a guide 73. Lubricant may flow from the bore 65, around the valve 67 and to the outlet 75 by means of lateral passages 77. The guide passage 73 and fluid passages 77 are in communication at 4.

From the outlet 75 the lubricant is intended to flow through a flexible pressure hose 79 and through a control valve on the end of it (not shown). Any of various control valves may be used, such as shown for example in Linders Patent 1,959,724, dated May 22, 1934. Such valves have controls on them so that when manually pressed the valves open, and it is intended that lubricant under pressure shall then instantly be available in the flexible hose 79. When the valve is released it closes and shuts off the flow.

In the outlet 75 at 81 is shown a pipe passage leading to a manually controllable shut-off valve 83, the outlet of which (with respect to pipe 81) is shown at 85 as being connected with the interior of the manifold 33. The circuit 81, 83, 85, is normally closed. It is referred to hereinafter as a manually controllable by-pass and opening and closing are accomplished at handle 87. Inasmuch as the valve 83 is of the plain cut-off variety, the inside details are not shown.

At numeral 88 is shown a manually controllable valve to permit at any time relief of pressure to the atmosphere.

Figure 4:
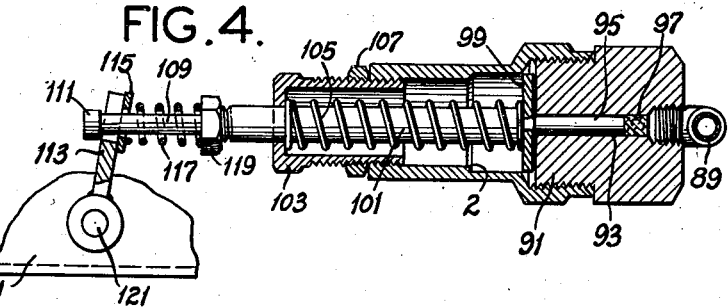
Fig. 4 is a longitudinal section taken on line 4—4 of Fig. 2.

At numeral 89 is shown a line leading from the outlet 75 to a special pressure relay 91 which (Fig. 4) contains a passage 93 in which is a sliding piston 95 packed at 97 and adapted to receive pressure from the line 89 and thereby be moved.

The piston 95 presses against the head 99 of a sliding stem 101. The stem 101 slidably passes through an adjusting cap 103 and the assembly of parts 99 and 101 are normally pressed to the right by means of a spring 105. The spring 105 may be adjusted in tension by adjusting the cap 103. A lock nut 107 maintains a given adjustment. It is clear that pressure in the line 89 will force the packing 97 and piston 95 to press the assembly 99, 101 against the reaction of spring 105. Shoulder 2 limits movement of head 99.

Exteriorly, the rod 101 is provided with a reduced extension 109 which is surrounded by a fork 113. Beyond the fork is a head 111. To the right of the fork (Fig. 4) is a loose washer 115 which is normally pressed against the fork 113 by means of a spring 117, the latter reacting against a shoulder 119.

Figure 3:
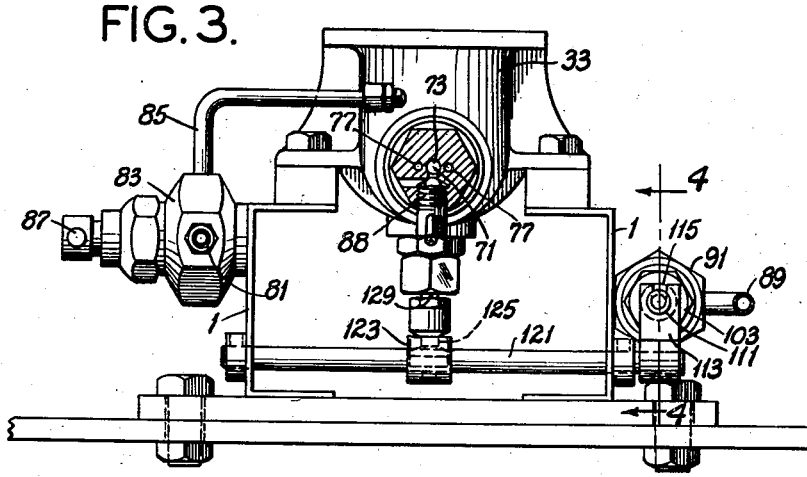
Fig. 3 is a vertical cross-section taken on line 3—3 of Fig. 1.

The fork 113 is attached to a rod 121 which has a rotary support in the chassis 1 (Fig. 3).

Within the side rails of the chassis 1 the rod 121 has fastened thereto a second fork 123 (Figs. 1 and 3) which cooperates at a groove 125 with the head 127 of a valve stem 129. The valve stem 129 passes through a packing gland 131 located in the bottom of the sump 63. Inside the sump, the stem 129 is provided with a poppet valve head 133 which, when the stem 129 is up, closes off the inlet 66, and when the stem 129 is down, the inlet 66 is open. When the port 66 is closed (stem 129 up) the plunger 27 will reciprocate without drawing fluid in from the sump and will therefore deliver nothing through the outlet 75. When the port 67 is open (stem 129 down) fluid is drawn in during reciprocation of the plunger 27 and forced under pressure through said outlet 75.

Operation of the device, generally considered, is as follows:

The tank 35 is filled with lubricant and the cover 55 applied. The crank 57 is revolved several times to force the piston 37 against the lubricant and at the same time to compress the spring 45 so as to store up energy thereby to effect continuous pressing of the piston on the lubricant for a substantial period of action of the pump. This places the lubricant under priming pressure to be forced into the port 66 whenever the valve 133 is open (stem 129 down).

Next, the manually operated by-pass valve 83 is opened by rotating the handle 87. This places the outlet 75 of the pump in by-passed communication with the manifold 63 and consequently unloads the pump.

Next, the gasoline engine is started by a rope at the starting pulley 135. It is to be understood that other starting means may be used where desirable, such as a crank, starter, or the like. Thereafter the engine 7 operates continuously until it is shut off in the usual manner. Thus, continuous operation is reflected in the operation of the belt drive 15, 17, 13, counter-shaft 11, and reciprocation of the plunger 27 through action of the crank 19 and connecting rod 21.

Since it may be assumed that there is no pressure in the outlet 75 at the start, even though the valve at the end of line 79 is closed, the spring 105 (Fig. 4) will have pressed back the stem 101 as shown, so that the fork 113 is drawn clockwise (Fig. 4), and the fork 123 is rotated downwardly (Fig. 1). This draws down the stem 129 and opens the valve 133 so that lubricant may be drawn into the opening inlet 66 and forced out through the valve 67 to the outlet 75. From here it returns to the manifold 33 through passages 81, 83, 85. The purpose of opening the by-pass is to permit of cranking of the engine 7 by taking the load off of the pump parts which it drives.

As soon as the engine has started and is in satisfactory operating condition for continuous action under load, the valve 83 is closed. This causes pressure to build up in the outlet 75 of the pump, the valve at the end of the line 79 being assumed still to be closed. This pressure is also transmitted to the pipe 89 and applied against the packing 97 of the plunger 95. Thus, the shaft 101 (Fig. 4) is forced against the reaction of the spring 105 to move the fork 113 counterclockwise, and to move the fork 123 (Fig. 1) up, thereby ultimately closing the port 66 by means of the valve 133. The particular pressure at which the port 66 will ultimately be closed depends upon the adjustment in spring 105 which is tensioned by adjustment of the cap 103. This occurs before head 99 reaches shoulder 2 and without compression of spring 117. As soon as the port 66 closes, no more supply lubricant is available, and the plunger 27 simply crosses and re-crosses the inlet 66 without pumping lubricant. This results is static pressure being available in the flexible outlet line 79 whenever the valve at the end of the line is open for delivery of lubricant.

As soon as said valve at the end of line 79 is opened, the pressure in the outlet 75 of the pump is incipiently reduced and likewise the pressure in the line 89. This unbalances the spring 105 so that it becomes effective to move the stem 101 to the right (Fig. 4) and thus through the linkage 113, 121, 123, 129 to open the port 66 by withdrawing therefrom the valve 133. Thus lubricant is drawn into the port 66 and forced into the line substantially to maintain the pressure which has incipiently been reduced.

Thus the valve 133 is pressed shut by means of the linkage connected therewith. Since this linkage has in it the spring 117 (located between the applied force on plunger 95 and the valve 133) valve closure is assured under various conditions of operation. Furthermore, there is a possibility that valve 133 may foul (not close), as, for example, when foreign material clogs its seat. It is then important that the linkage connected with it have some resilient play under the concurrent rising pressure. Thus should the line pressure go beyond the amount predetermined by the adjustment of the cap 103, this spring 117 is simply compressed. This has the effect of permitting the pressure to rise above that desired. In order that the spring 117 may not be over-compressed the motion of the stem 101 is limited by contact of the head 99 with shoulder 2. In order that pressure rise beyond that desired may not exceed a safe amount for the lines (after head 99 contacts shoulder 2), there is provided as shown at numeral 137 the safety valve. This valve is of the usual spring-loaded type which opens at a safe pressure. This pressure however is higher than the operating pressure. When this valve opens, pumping simply goes on with exudation of lubricant from the safety valve until the engine is stopped and repairs are made.

The contact between 99 and 2 is made before the relief pressure is reached, and before the spring 117 is compressed to its limiting value. Thus the spring 117 serves as a resilient member in the linkage between the rod 101, the valve 133 of spring 105 acts as a balancing pressure spring for the pressure in the line, and the shoulder 2 acts to protect both springs 105 and 117 and the linkage against excessive pressure which requires a complete relief for safety.

Reference to Fig. 5 will indicate special features of the outlet valve 67 which are described as follows:

This valve has its stem 71 sliding in the guide bearing 73, the bearing 73 and stem 71 being long enough for accurate guiding. The bearing 73 does not function as an outlet port, except to the relief valve 88, via 4. The outlet is effected through the lateral ports 77, which however are in communication through the outlet 75 with said hollow bearing 73. The head of the valve comprises a collar 139 which serves as a stop to limit the movement of the valve in the direction of closing. It is not the intention that this collar shall form the effective closing seat of the valve. That is to say, the bearing between the collar and the sleeve 61 is not such as necessarily to seal. The reason for this will appear.

Sealing is effected peripherally of the piston-like portion 141 of the valve which has a close sliding fit in the cylinder 65 and which is slightly chamfered at 143 to provide proper entry under action of the spring 69. For example, the fit between the piston portion 141 and the bore 65 may be a lap fit.

The above-described valve construction is particularly suited to the hard service to which a valve in this location is subjected. It will be seen that the operation of the relatively high-speed engine 7 and pump subjects a valve at this location to hard use, as compared to the action of electric motors. The result is that the pounding on the ordinary seat below a shoulder such as 139 (Fig. 5) pounds the valve seat until it leaks, particularly where there is some foreign material in the lubricant. With the described valve, wear and deformation beneath the shoulder 139 make no difference, because the valve is not depended upon at this point to maintain a seal. The seal is maintained between the cylindric outer base of the projection 141. Any foreign material that goes through the valve cannot be lodged between the cylinder 141 and the bore 65, because it is wiped off in the process of valve closure. If it lodges upon the open edge of cylinder 141 it is sheared off in view of the fact that 143 is not made of soft packing material. It is to be understood that at the time the plunger 27 comes forward the cylinder 141 is forced completely from the bore 65 to permit outward passage of lubricant. The lubricant then passes through the passages 77 and to the outlet 75.

A feature of some importance is that the valve 133 is closed during periods when lubricant is not called for over the line 79. Under these conditions, the plunger 27 simply draws a vacuum in the regions 65, 67 without substantial recompression being necessary. Thus, the outlet valve 67 tends to remain seated and becomes operative only during flow conditions in the outlet 79. This distinguishes from those constructions heretofore suggested in which during periods when lubricant was not called for there was a continuous flow from the outlet, through a by-pass and back to the inlet. The absence of such a flow herein not only saves the valve 67 from undue activity, but also prevents churning of lubricant which occurred heretofore in a by-pass circulation.

In view of the above, it will be seen that the several objects of the invention are achieved, and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. Lubricating apparatus comprising a reciprocating pump, continuous driving means for said pump, said pump having an inlet and an outlet, a normally open valve at the inlet, stop means for definitely determining the closed position of the valve, a linkage responsive to pressure in the outlet to close said valve, spring means normally biasing the linkage to open position of said valve against said pressure, and substantially resilient means in said linkage forming a force-transmitting member therein and operative after said valve has substantially closed to be compressed to permit some linkage operation after movement of the valve against said stop means.

2. Lubricating apparatus comprising a reciprocating pump, continuous driving means for said pump, said pump having an inlet and an outlet, a normally open valve at the inlet, stop means for definitely determining the closed position of the valve, a linkage responsive to pressure in the outlet to close said valve, spring means normally biasing the linkage to open position of said valve against said pressure, substantially resilient means in said linkage forming a force-transmitting member therein and operative after said valve has substantially closed to be compressed to permit some linkage operation after movement of the valve against said stop means, and means for limiting the deflection of the first-named spring to a degree that will prevent the second-named spring from exhausting its maximum deflection.

3. Lubricating apparatus comprising a reciprocating pump, continuous driving means for said pump, said pump having an inlet and an outlet, a normally open poppet valve at the inlet, the seat of the valve determining substantially the closed position of the valve, a linkage responsive to pressure in the outlet to close said valve, spring means normally biasing the linkage to open position of said valve against said pressure, substantially resilient means in said linkage forming a force-transmitting member therein and operative after said valve has substantially closed to be compressed to permit some linkage operation, means for limiting the deflection of the first-named spring to a degree that will prevent the second-named spring from exhausting its maximum deflection, and a relief valve associated with the outlet which is operative after said limiting means becomes effective.

VICTOR G. KLEIN.